Oct. 21, 1930.   H. A. FISHER   1,778,798
ANNEALING BOX
Filed April 30, 1929
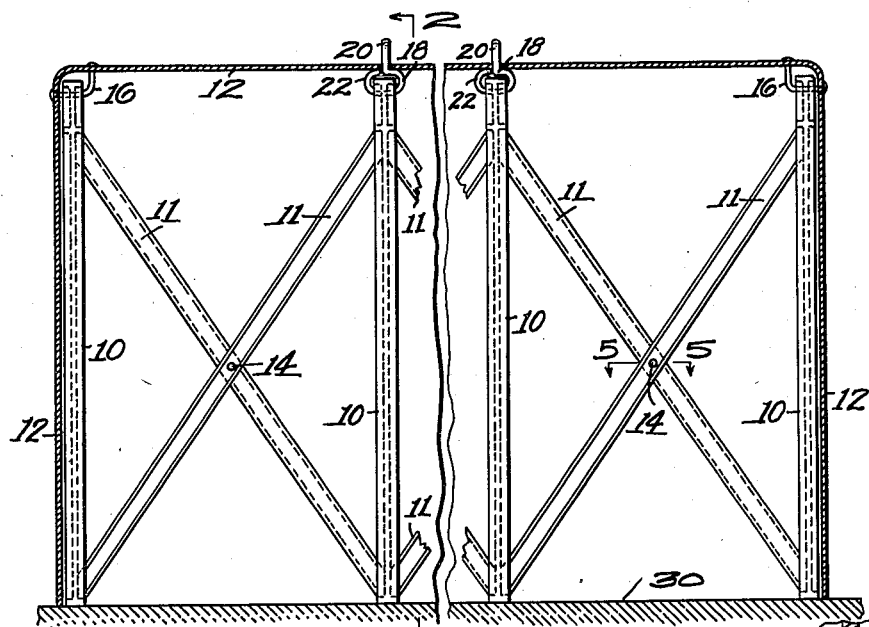
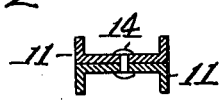
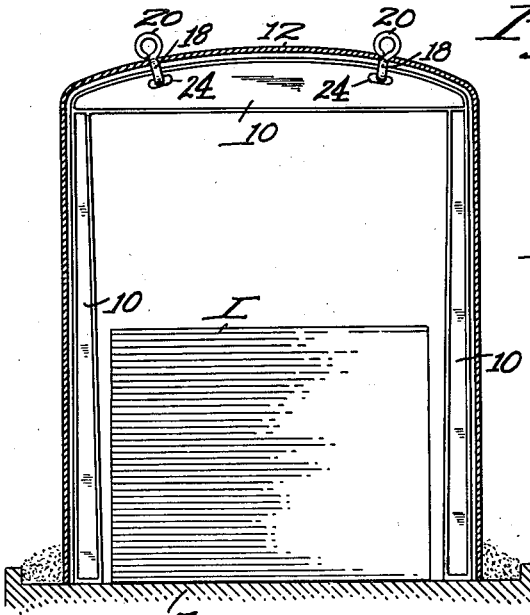
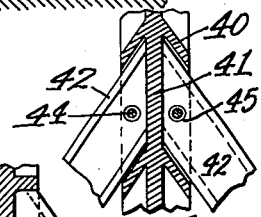
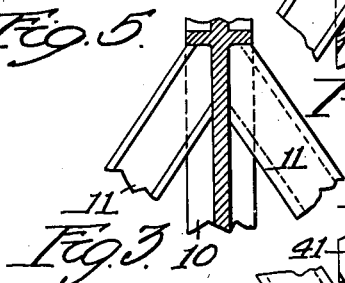

Patented Oct. 21, 1930

1,778,798

UNITED STATES PATENT OFFICE

HERMAN A. FISHER, OF HAMMOND, INDIANA

ANNEALING BOX

Application filed April 30, 1929. Serial No. 359,271.

This invention relates to a box or cover adapted to be placed on or over a suitable base in an annealing furnace and to thereby protect the articles to be annealed from direct contact with the furnace gases.

It is the general object of my invention to provide an annealing box or cover of an improved construction by which the weight may be reduced, the useful life of the box may be prolonged, and the transfer of heat may be facilitated.

A further object of my invention is to provide a box which will effectively resist the tendency in such structures to warp or twist under the excessive changes in temperature to which they are exposed.

My invention further relates to the provision of an annealing box so designed that it may be conveniently manufactured from highly heat-resistant metal, which has not been found adaptable to the manufacture of the heavy castings heretofore used in annealing boxes.

My invention further relates to arrangements and combinations of parts which will be hereinafter described and more particularly pointed out in the appended claims.

A preferred form of the invention is shown in the drawings in which

Fig. 1 is a sectional side elevation of my improved annealing box;

Fig. 2 is a sectional end elevation thereof, taken along the line 2—2 in Fig. 1;

Figs. 3 and 4 are enlarged detail views to be described;

Fig. 5 is a detail sectional plan view, taken along the line 5—5 in Fig. 1; and

Figs. 6 and 7 are detail views of a slight modification.

Referring to the drawings, my improved annealing box comprises inner frame members 10, braces 11 and an outer casing 12. The inner frame members 10 are preferably formed as U-shaped castings of some highly heat-resistant alloy and each comprises a top or arch portion and two side portions. These different parts are preferably of H section, by which their strength and stiffness is increased. The top or arch portion of the frame members 10 is formed convex on its upper surface, supporting the arch of the casing 12, as indicated in Fig. 2.

The braces 11 are also preferably of a heat-resistant alloy and may be conveniently formed from bars of U-shaped section, secured together by rivets 14 at their crossing points, as clearly shown in Fig. 5.

The ends of the braces 11 are preferably beveled, as indicated in Figs. 3 and 4, and are received in grooves or pockets in the sides of the U-shaped frame members 10. The braces are loosely seated in their pockets in the frame members 10 but in this form of the invention are unattached thereto.

The casing 12 is preferably formed of relatively thin sheet metal and is desirably produced by drawing the casing from a single flat blank, so that the casing is seamless. The casing may, however, be built up by riveting or welding together the necessary separate sections required to produce the shape and outline indicated in Figs. 1 and 2.

My improved annealing box is assembled by setting up the U-shaped members 10 in spaced relation, with the braces 11 inserted between the frame members 10, and then dropping the casing 12 over the assembled frame members, after which fastening devices 16 and 18 are inserted.

The devices 16 may consist of angular rivets extending loosely through openings in the upper or arch members of the end frames 10, and the members 18 may comprise heads or eyes 20 above the casing 12 and hook-like portions 22 extending through openings in the top of the casing 12 and through corresponding openings 24 in the arch members of the intermediate frames 10, the inner ends of the hook portions 22 being bent up around the frame members 10, as indicated in Fig. 1, after the parts are assembled.

All parts of my improved casing are thus loosely articulated and are capable of more or less relative movement during the expansion or contraction caused by temperature changes. The heads or eyes 20 of the fastening members 18 form convenient points of attachment for lifting the annealing box off of its base 30 when the load L is to be inserted or removed.

In Figs. 6 and 7 I have shown a slight modification in which more definite pockets are formed by flanges 40 on frame members 41. The ends of the diagonal braces 42 are loosely seated in these pockets and may be retained by pins or studs 44, passing through enlarged openings 45 in said braces. The entire frame-work is thus loosely articulated, while limited relative movement of the parts is permitted.

Having described the construction of my improved annealing box, the advantages thereof are readily apparent. By the use of a relatively thin sheet metal casing and relatively light frame members 10 and braces 11, the weight of my improved annealing box is greatly reduced over the heavy cast steel boxes previously used and in fact does not commonly exceed one third of the weight thereof.

The relatively light parts are of such shape and dimensions that they may be readily made of highly heat-resistant alloys, which are adapted to retain their shape under annealing temperatures and which will not be rapidly reduced in thickness by scaling or oxidation.

Warping of the casing or frame members is substantially eliminated by their light but strong construction and by their loose articulation, and even if slight warping should occur, the relatively light parts are quickly and easily straightened.

If the casing 12 should become worn or should burn away during continued use, the casing may be readily removed from the inner frame and a new casing substituted at much less expense than the replacement of the entire box which has been heretofore necessary.

Furthermore, the relatively light construction of my improved box results in marked economy in fuel, as there is a greatly reduced dead load of metal to be heated, and furthermore the heat transfer through the relatively thin casing is much more readily accomplished than through the very heavy castings heretofore used.

Another advantage of my improved box lies in the rapidity with which the box and its charge may be cooled after the annealing operation is over, thus speeding up the operation and reducing the number of annealing boxes required for a given volume of business.

Having thus described my invention and the advantages thereof, I do not wish to be limited to the details herein disclosed, otherwise than as set forth in the claims, but what I claim is:—

1. An annealing box entirely open at the bottom and comprising a loosely articulated inner frame and a relatively thin casing loosely connected thereto, said casing being freely expansible and contractable independently of said frame.

2. An annealing box entirely open at the bottom and comprising a plurality of rigid inner frame members, braces holding said members in spaced relation, and a casing enclosing and loosely secured to said frame members, said casing being freely expansible and contractable independently of said frame.

3. An annealing box comprising a plurality of spaced rigid inner frame members, crossed diagonal braces loosely interposed between said frame members, and a casing enclosing and loosely secured to said frame members.

4. An annealing box comprising a plurality of rigid U-shaped inner frame members, diagonal braces holding said members in spaced relation, and a casing enclosing and loosely secured to said frame members.

5. An annealing box comprising a plurality of spaced rigid inner frame members, crossed diagonal braces loosely interposed between said frame members, and a casing enclosing and loosely secured to said frame members, said frame members, braces and casing being formed entirely of highly heat-resistant metal.

6. An annealing box comprising a plurality of spaced rigid U-shaped inner frame members, crossed diagonal braces loosely interposed between said frame members, and a casing enclosing and loosely secured to said frame members, said frame members, braces and casing being formed entirely of highly heat-resistant metal, and said casing being formed of relatively thin sheet metal.

7. An annealing box comprising a plurality of spaced rigid U-shaped inner frame members, crossed diagonal braces loosely interposed between said frame members, a sheet metal casing enclosing said frame members, and devices to secure said casing loosely to said frame members, certain of said devices having apertured heads outside of said casing by which the box may be lifted.

In testimony whereof I have hereunto affixed my signature.

HERMAN A. FISHER.